United States Patent [19]

Edelson

[11] Patent Number: 6,089,311
[45] Date of Patent: *Jul. 18, 2000

[54] METHOD AND APPARATUS FOR VACUUM DIODE HEAT PUMP

[75] Inventor: Jonathan Sidney Edelson, Eli, Israel

[73] Assignee: Borealis Technical Limited, Gibraltar

[*] Notice: This patent issued on a continued prosecution application filed under 37 CFR 1.53(d), and is subject to the twenty year patent term provisions of 35 U.S.C. 154(a)(2).

[21] Appl. No.: 08/498,199

[22] Filed: Jul. 5, 1995

[51] Int. Cl.⁷ ...................................... F28D 15/00
[52] U.S. Cl. ...................... 165/104.23; 62/3.1; 62/259.2; 378/4
[58] Field of Search .................. 165/104.23, 32, 165/96, 104.33, 104.26; 62/3.1, 259.2; 378/4

[56] References Cited

U.S. PATENT DOCUMENTS

| | | |
|---|---|---|
| 4,004,210 | 1/1977 | Yater . |
| 4,463,798 | 8/1984 | Pogson et al. ............... 165/1 |
| 4,819,011 | 4/1989 | Yokota ....................... 62/3.1 |
| 5,040,381 | 8/1991 | Hazen ........................ 62/3.1 |
| 5,305,363 | 4/1994 | Burke et al. ................. 378/4 |
| 5,356,484 | 10/1994 | Yater ....................... 136/200 |
| 5,699,668 | 12/1997 | Cox .......................... 62/3.1 |

FOREIGN PATENT DOCUMENTS 0861916  9/1981  U.S.S.R. ........................... 165/104.23

OTHER PUBLICATIONS

Kumar et al., Diamond–based Field Emission Flat Panel Displays, Solid Stte Technology, pp. 71–72, May 1995.

Yater, Physical Review A, vol. 26, No. 1, Physical basis of power conversion of Energy Fluctuations, pp. 523–538, Jul. 1982.

*Primary Examiner*—Christopher Atkinson

[57] ABSTRACT

A new use for thermionic vacuum diode technology is disclosed wherein a vacuum diode is constructed using very low work function electrodes. A negative potential bias is applied to the cathode relative to the anode, and electrons are emitted. In the process of emission the electrons carry off kinetic energy, carrying heat away from the cathode and dissipating it at an opposing anode. The resulting heat pump is more efficient than conventional cooling methods, as well as being substantially scalable over a wide range of applications. Fabrication using conventional microelectronic fabrication techniques is possible.

30 Claims, No Drawings

METHOD AND APPARATUS FOR VACUUM DIODE HEAT PUMP

BACKGROUND—FIELD OF INVENTION

The present invention relates to heat pumping apparatus, and in particular to an improved heat pump for refrigerators and similar devices.

BACKGROUND—PRIOR ART

A heat pump, as used in refrigerators and similar systems, is a device which transfers heat from one place to another, generally against a thermal gradient. For example, in a refrigerator, heat is 'pumped' from the cold box to the ambient air. This is commonly achieved by evaporating a refrigerant fluid. As the fluid evaporates, it takes up heat from its surroundings, a technique well known to the art. The resulting vapor is both moved to another part of the device and is adiabatically compressed. The now hot compressed vapor dissipates its heat to the surroundings and liquifies, whereupon the cycle may begin again.

All such devices are subject to wear and tear insofar as they require the use of motorized elements and moving parts. Additionally, there is a danger that the compressor may be damaged if fluid condenses at the wrong stage in the process. Furthermore, such devices are noisy. Such devices are also inefficient, achieving in conventional refrigerating practise roughly one-half of the theoretical maximum efficiency, as set by Carnot heat engine theory.

Typically, compressors are relatively inexpensive when used in conventional refrigerators. But when they are used in applications of a different scale, they become increasingly expensive. In very small-scale applications a suitable compressor may cost more than the entirety of the rest of the device. In industrial-scale applications, such as cold storage rooms, the process also commonly requires the use of a motorized fan to cool the electric pump at an additional cost in energy consumption, noise, and expense.

Conventional refrigeration systems typically experience temperature fluctuations within the refrigerated compartment, caused by the 'on' or 'off' nature of the compressor based systems. They also suffer long delays when changing from one temperature to another. Previous refrigeration systems commonly used halocarbons as refrigerant fluids. These fluids are a known source of stratospheric chlorine, and are thus possibly linked to stratospheric ozone depletion. The use of such refrigerant fluids may be a cause of widespread public anxiety about possible environmental damage. Such fluids are increasingly likely to come under the control of environmental and other agencies. Improvements in the art have resulted in the use of hydrocarbon and halo-hydrocarbon fluids which do not deplete atmospheric ozone. These fluids can be made to operate as efficiently as halocarbons, but only in conjunction with improved design. These fluids also may be more expensive than conventional halocarbons. In any case, the problems of noise, wear and tear, temperature control and cost effectiveness at extreme scales of use are not solved by this improvement.

In the prior art is the thermo-electric cooler or Peltier effect device. This device is essentially a thermocouple operated in reverse, pumping heat from one junction to another while under the influence of an electric current.

Such devices are easily scalable and are particularly suited to small scale applications. They may also be used in multiple configurations to enhance the degree of heat transference obtainable. However such devices typically require expensive materials to produce, and are quite inefficient in their use of electricity.

In my previous disclosure, filed Mar. 7, 1995 titled 'Electrostatic Heat Pump Device and Method', Ser. No. 08/401,038, two porous electrodes separated by a porous insulating material to formed an electrostatic heat pump. In said device, evaporation and ionization of a working fluid in an electric field provided the heat pumping capacity. Such a device offers the scalability and lack of moving parts associated with the Peltier effect device but allows the use of cheap and environmentally friendly substances in construction and as the working fluid.

The use of electrons as the working fluid is disclosed in my prior application. Herein is disclosed an improved device and method for the use of electrons as the working fluid in a heat pumping device.

BACKGROUND—ELECTRON DEVICES

All electron devices require a source of electrons, or cathode. Traditionally, cathodes for vacuum tubes and cathode ray tubes used thermionic emission to produce the electrons. This requires raising cathode materials to very high temperatures either by direct conduction of current or through the use of auxiliary heaters. The process is inefficient, requiring relatively high currents and dissipating most of the energy as wasted heat.

Recently, there has been substantial investigation of replacements for the thermionic cathodes. Specifically, 'cold cathode' devices have attracted much attention. These cathodes may be very efficient because they eliminate the need to heat the cathode material.

There are three types of cold cathode known to the art. The field emission type of cold cathode device emits electrons from the tip of a conical emitter corn. In the tunnel type of cold cathode device electrons pass through a thin insulating film by the tunneling effect. In the avalance type of cold cathode device the electrons emitted are a fraction of a current that flows through a reversely biased p-n junction of a diode orientated such that the junction is parallel to the surface of the emmitter.

While these cold cathode structures can be made in almost any size and may have many applications as single units, their best performance and major application is expected to come from extreme miniaturization, in structures formed of dense arrays. All three types of cold cathode may be manufactured in microscopically small sizes by techniques well know in the art of semiconductor microelectronics fabrication.

For example, silicon thin-film technology has now advanced to the point where cold cathode structures may be manufactured in arrays of up to 5000 cathodes at packing densities of up to 640,000 per square centimeter.

Cold cathode structures are useful electron sources for applications such as displays, vacuum microelectronic devices, and electron microscopes. Additional electrodes may be, and commonly are, used to collect and/or control the electron current. This technology is presently undergoing extensive development, with many articles being published and numerous patents being issued. Work in the art has been focused on the development of better emmissive structures and materials, the use of such devices in electronic applications, and enhanced methods of fabricating such devices as well as fabricating integraded devices. The use of such devices for heat pumping is unknown in the art.

BACKGROUND—THERMIONIC EMISSIONS

All conductors may be characterized by a 'work function'. The work function is the quantity of energy required to move a single electron from the surface of a neutral sample of the conductor to free vacuum. Generally the work function is measured in electron volts. This work function may be considered a potential barrier to the escape of electrons from the conductor.

The conduction band electrons of a conductor exhibit a distribution in kinetic energy, much as the individual molecules of a gas move at widely varying speeds. This distribution is related to the common Boltzman distribution, often encountered in studies of thermodynamics. Some fraction of the electrons present in the conduction band of the conductor will be moving at such a speed and in such a direction that they may overcome the potential barrier caused by the work function, and escape the conductor. For a lone conductor in space, the escaping electrons cause a negative charge to be built up in the region surrounding the conductor, whilst the conductor acquires a positive charge. However, when additional circuit elements are added, and an external electric field applied, a current can be caused to flow: electrons escape from the cathode, are carried by the electric field to the anode, and are then carried back to the cathode via a conductor. In the case that a source of electric potential is part of the return circuit, we have the standard vacuum diode. In the case that a load is part of the return circuit, we have a vacuum thermionic converter, using the heat applied to the cathode in order to produce an electric current flow. The latter device is well known in the prior art.

The cooling of conventional thermionic cathodes by electron emmission is a known side effect of thermionic emmission, mentioned and then ignored in texts on vacuum tubes, and fully expected from the above understanding of thermionic emission. The electrons which escape the surface of the cathode are selected by the work function to be those with the highest energy, thus the remaining electrons have a lower average kinetic energy, and thus a lower temperature. As long as heat is added to the cathode, additional hot electrons will be produced, and electrons will continue to be emmitted. For vacuum tube use, thermionic cathodes are heated to temperatures of 1000 K or above in order to achieve appreciable thermionic emmission. At these temperatures, the cathodes dissipate considerable heat by radiation, generally considerably more than that carried away by the 'evaporation' of electrons. No known direct use of thermionic emission for cooling and heat pumping is known, the cooling being a known yet undesired aspect of cathode operation.

OBJECTS AND ADVANTAGES

Accordingly, besides the objects and advantages of the methods of pumping heat in refrigerators and similar devices described in my above patent, several objects and advantages of the present invention are as follows:

An advantage of the present invention is the elimination of inefficiencies arising from the use of chemical working fluids.

It is accordingly an object of the present invention to provide an improved method of refrigeration which is more efficient than previous methods.

Another advantage of the present invention is the elimination of the cost of utilising a chemical working fluid.

Accordingly it is a further object of the invention to provide a method of refrigeration which is less expensive than previous methods.

Another advantage of the present invention is that it provides greater flexibility and scalability in the creation of refrigeration devices allowing a manufacturer of such devices to manufacture devices of many different shapes and sizes and physical properties.

Accordingly it is a further object of the present invention to provide a method of refrigeration which may be applied to devices of very small and very large scale, as well as being used for any device which currently uses conventional heat pumping technology.

Accordingly it is an object of the present invention that it provides a universal means of pumping heat such that it is suitable for all known applications where the pumping of heat is required.

Another advantage of the present invention is that it provides a new use of what heretofore was an undesired side effect of electron emmission.

Accordingly it is an object of the present invention to utilise a cold cathode for the purpose of pumping heat.

Still further objects and advantages will become apparent from a consideration of the ensuing description.

DESCRIPTION OF THE INVENTION

The present invention discloses a new use for the thermionic vacuum diode, using cold cathode technology to suitably modify the work function of the electrodes of said diode, using discrete or array cathodes and anodes, as the central component of a heat pump. The present invention discloses a substantially new field of applications for field emission cathode technology, as well as other cold cathode technologies. It is envisaged that this method may be successfully exploited using field emission cathode devices, tunnel cathode devices, or avalanche cathode devices. Consequently, for the purposes of this embodiment, no preferred type of cathode is defined, since different applications of the method may find one type more suitable than another. For the purpose of the present invention, it must be understood that such cold cathode technologies are used to lower the effective workfunction of said electrodes.

A diode is connected to a power supply such that negative bias is applied to the cathode relative to an anode, as in the conventional operation of a vacuum diode. Said cathode is additionally thermally coupled to a mass to be cooled, while said anode is additionally thermally coupled to a mass to be heated. Upon application of bias voltage, electrons will be emmitted from said cathode and collected at said anode. The thermionic emmission of electrons will cause heat to be carried away from said cathode, whilst the collection of electrons at said anode will cause heat to be released at said anode, the net result being that heat is pumped from said cathode to said anode, and by the thermal coupling, heat is pumped from said mass to be cooled to said mass to be heated. Through adjustment of the applied voltage, current flow may be regulated, and the rate of heat pumping controlled in a continuously variable fashion. Such control will allow for more stable maintenance of temperatures.

The cathode will, for the preferred example embodiment of this invention, be characterised by an electrode surface with a workfunction of approximately 0.3 eV for applications involving cold side temperatures on the order of 273 K. Higher work functions are acceptable for applications involving higher temperatures whilst lower work functions will be required for lower temperature operation.

The determination of necessary work function is as follows. Electrons escaping the surface must carry away a minimum of one work function worth of energy. Owing to the distribution of electron energies, the average electron actually escaping the surface will carry away twice the work function in energy. Work function is often expressed in terms of electron-volts and may be converted to more standard units as follows; the amount of energy carried by a single electron expressed in electron-volts is numerically equal to the amount of energy carried by one ampere-second of electrons when the latter energy is expressed in watt-seconds. For the work-function presented above, the average electron will carry 0.6 eV of energy, thus one ampere-second of electrons will carry away 0.6 watt second of energy, or a current of one ampere will carry away energy at a rate of 0.6 watt.

The maximum current per unit area is determined by the number of electrons which have enough kinetic energy to escape the surface of the conductor. The higher the work function, the fewer electrons capable of escaping. The higher the temperature, the greater the quantity of electrons which are capable of escape. The following semi-emperical equation, known as Richardson's Equation, relates these factors:

$$I_s = AT^2 e^{-w/kT}$$

Where $I_s$ is the current per unit area, T is the absolute temperature, k is the Boltzman gas constant, and A is a semi-emperical 'constant'.

Raising the work function will reduce the number of electrons emmitted, but each electron will carry away a greater amount of heat. Likewise, lowering work function will allow for greater electron flow. Thus, for any given temperature, a tradeoff may be made between the current flow and the energy carried by each electron.

Current flow in vacuum diodes is additionally limited by space charge effects. These effects are well known, and described by Childs'Law, as follows:

$$I_s = 2.34 \times 10^{-6} \frac{e_b^{3/2}}{d^2} amp\ cm^2$$

where $e_b$ is the voltage applied between anode and cathode, and d is the distance between anode and cathode expressed in cm, and $I_s$ is the current per cm². As can be seen, very small distances between anode and cathode, or large surface areas, are required in order to minimize the voltage required to obtain requisite current flow. Any increase in voltage will result in reduced heat pump efficiency.

From the previous relations, it can be seen that the distance between cathode and anode must be small, work function must be relatively low, and currents must be high. For conventional refrigeration and air conditioning service, currents on the order of 10 amp/cm², work function of 0.3 eV, and electrode spacing of 0.1 μm provide a good initial basis for the necessary engineering tradeoffs. The necessary spacing between electrodes may be obtained using conventional microelectronic fabrication techniques. Of primary importance in the development of thermionic refrigeration is the production of a low work function cathode.

Low work function cathodes have been developed by the electronics industry for use in flat panel displays, as well as so called Vacuum Micro-Electronic Devices. Various methods, generally employing conventional photolithographic techniques well known to the microelectronics fabrication industry, are used to produce such cathodes. As currently used in the art, such micro fabrication techniques manipulate the shape of the workfunction potential barrier using quantum mechanical effects. These effects can be used either to allow externally applied energy to extract electrons from the electrodes, or can be used to lower the effective workfunction of the material allowing low temperature thermionic emmision. Microelectronic mass production techniques allow such devices to be produced in large quantity at low cost.

The work-function of the anode must be similar to that of the cathode, otherwise contact potential difference will lead to reduced efficiency. For the purposes of the preferred embodiment, it is likely to be placed very close to the cathode, on the order of 0.1 μm. In a preferred embodiment, both the cathode and anode are fabricated at the same time using microelectronic fabrication techniques in order to maintain them at appropriate spacing. Owing to the close spacing of the cathode and anode, and the possibility that both may be fabricated together, it becomes meaningful to envisage a sheet like structure where one side is characterised absorbing heat, and the other side by rejecting heat.

The above description discloses that a current between the cathode and anode will be capable of pumping heat from cathode to anode. Furthermore it is disclosed that a voltage will need to be applied between cathode and anode to overcome space charge effects. However, a heat pump requires a certain inate energy input, described by the Carnot efficiency. This energy input requirement means that a higher voltage, over and above that required by space charge effects, must be applied to the electrodes.

This additional voltage requirement may be simply calculated by determining the Carnot work required to pump the specified amount of heat from the cathode to the anode. Using the known current flow and the relationship that energy equals charge time voltage, the voltage may be calculated by dividing the Carnot power requirements by the current flow between electrodes. As can be seen, if the Carnot power requirements are negative, for example if the cathode is hotter than the anode, power may be extracted from the system. This is the Thermionic converter, a well known device for converting thermal power into electrical power.

An example system will serve to illustrate the Carnot requirements. Two 0.3 eV electrodes, one at 45° F., the other at 125° F., moving 1 coulomb of charge would move 0.6 joule of heat. Therefore:

$$\frac{q_1}{T_1} = \frac{q_2}{T_2} \quad \frac{0.6J}{280K} = \frac{x}{325K} \quad \therefore x = 0.6943J$$

So to move 0.6 J of heat from cold to hot requires 0.094 J of Carnot work. To move this heat, one ampere-second of electrons was used, and 0.094 watt-seconds of work, giving a voltage in this example of equilibrium of 0.094V. This 0.094V will be in addition to any voltage required to overcome space charge effects.

This is the voltage at equilibrium, with no heat pumping action. But for the purposes of the example embodiment, it is necessary to know the operational voltage with a finite heat pumping action.

The major dissipating factor is caused by space charge. The relation between current, voltage and spacing is Child's Law, as mentioned above. For the purposes of the example embodiment, it is presumed that the electrodes will be separated by micro-machined structures. For example, the surface of each electrode may be coated with a layer of insulating oxide, etched away in strips so that the strips on one electrode are of a different orientation to the strips on the other. By pressing the two surfaces together, a tiny space is created between areas of each electrode where no oxide coating is present. The electrodes would thus be separated by a distance equal to twice the thickness of the oxide layer.

A figure of 0.1 μm is proposed for the purpose of this example, which is an order of magnitude in keeping with known results in microelectronics fabrication know to the art. In an alternative embodiment, microfabrication techniques may be used to form both cathode and anode separated by a soluable temporary support structure. The support structure may be etched away, leaving appropriately spaced electrodes.

Assuming, then, a distance of 0.1 micron between the electrodes, the voltage needed to push 10 amperes per square centimeter becomes, using Child's Law, 0.0057V, in addition to which must be added the 0.0943V required to achieve equilibrium, as described above, giving an overall figure of 0.1V. As can be seen from the accuracy of the inital data going into these calculations, the final number shows more apparent precision that is appropriate. It is more correct to say that the voltage requirements for the present example embodiment are 0.1V required by Carnot, and 0.06V for space charge effects. Thus the device operates within a few percent of the theoritical maximum of Carnot efficiency.

Expanding from this, slightyl more than one watt of external power will move six watts of heat, or approximately 20.5 btu/hr.

By way of comparison with conventional refrigerators, a typical device pumping 6000 Btu/hr of heat will consume 600 W of power, against 370 W utilising thermionic field emission cathodes, rendering the thermonic field emission method 60% more efficient in energy consumption than conventional methods.

Summary, Ramifications, and Scope

It may be seen from the above description that this new method for pumping heat admits of a wide variety of applications. It is fully scalable, and may be used with different types of cold cathode, and in applications where the cathodes are discrete units, or are combined in an array.

It will further be seen that the method of the invention allows the construction of heat pumps which have no moving parts, do not require the use of obnoxious or environmentally suspect fluids, and do not require the use of expensive and inefficient motors.

All applications of heat pumping devices known to the art may be performed using the method of the invention, with consequent savings of energy.

In particular, applications which cannot easily be realised under prior art become possible using the method of the invention.

For example, in one embodiment of the invention an array of micro-machined cold cathodes, a cooling system can be devised for the cooling of small micro-electronic circuits without expensive recourse to wasteful Peltier Effect devices or conventional refrigerant fluid systems.

In another embodiment, small devices using the method of the embodiment may be woven into a flexible material and used to fashion coverings and containers which may be used to keep objects wrapped in such a material cool.

In yet another embodiment, the method may be applied to microsurgical techniques where it is desirable to maintain a stable temperature in the immediate vicinity of surgical activity.

As a reversible technique, a further embodiment of the method allows devices to be constructed which apply heat as well as remove it from a particular area, thus making it possible to maintain a constant temperature, regardless of the ambient temperature surrounding the targetted area.

Although the description above contains many specificities, these should not be construed as limiting the scope of the invention but as merely providing illustrations of some of the presently preferred embodiments of this invention. For example, cold cathodes with higher work functions may be used when dealing with high temperatures. The spacing of cathode and anode may also vary depending on the application involved and the addition of vacuum tubes to assist the flow of electrons from cathode to anode.

Thus the scope of the invention should be determined by the appended claims and their legal equivalents, rather than by the examples given.

I claim:

1. An apparatus for pumping heat comprising:
    a) a vacuum diode, comprising:
        i) a cold cathode; and
        ii) an anode;
    b) a first mass from which heat is to be removed, thermally coupled to said cold cathode;
    c) a second mass to which said heat is to be carried, thermally coupled to said anode, wherein said anode and said cold cathode are closely spaced;
    d) a supply of electrical power for supplying current at suitable voltage to said vacuum diode; and
    whereby said cold cathode, having a work function consistent with copious thermionic thremionic electron emission at the temperature of said first mass, is separated from said anode by a vacuum.

2. The apparatus of claim 1 wherein said cold cathode comprises a material capable of copious electron emission at the temperature of said first mass.

3. The apparatus of claim 2 wherein said cold cathode has a work function of 0.3 eV or less.

4. The apparatus of claim 1 wherein said anode has a work function and comprises a material capable of copious electron emission at the temperature of said second mass.

5. The apparatus of claim 4 wherein said anode has a work function of 0.3 eV or less.

6. The apparatus of claim 1 wherein said cold cathode includes a coating.

7. The apparatus of claim 1 wherein said anode includes a coating.

8. The apparatus of claim 1 wherein said cold cathode is on the underside of a computer chip substrate.

9. The apparatus of claim 1 wherein said supply of electrical power is variable, whereby a rate of heat pumping may be controlled.

10. A vacuum diode comprising:
    a cold cathode having a work function consistent with a copious thermionic electron emission at about room temperature, said cold cathode thermally coupled to a first mass from which heat is to be removed;
    an anode thermally coupled to a second mass to which heat is to be carried, wherein said anode and said cold cathode are closely spaced;
    a vacuum separating said cold cathode and said anode; and
    a supply of electrical power for supplying said vacuum diode a voltage sufficient to enable said copious thermionic electron emission to occur.

11. The apparatus of claim 10 wherein said cold cathode comprises a material capable of copious electron emission at the temperature of said first mass.

12. The apparatus of claim 10 wherein said anode comprises a material capable of copious electron emission at the temperature of said second mass.

13. The apparatus of claim 10 wherein said cathode includes a coating.

14. The apparatus of claim 10 wherein said anode includes a coating.

15. The apparatus of claim 10 wherein said cold cathode is on an underside of a computer chip substrate.

16. The apparatus of claim 10 wherein said supply of electrical power is variable, whereby a rate of heat pumping may be controlled.

17. A vacuum diode comprising:

a cold cathode thermally coupled to a first mass from which heat is to be removed and said cold cathode having a work function consistent with a copious electron emission at the temperature of said first mass;

an anode thermally coupled to a second mass to which heat is to be carried, with said cold cathode and said anode being closely spaced; and a supply of electrical power for supplying said vacuum diode a voltage sufficient to enable said copious thermionic electron emission from said cold cathode to occur and said voltage sufficient to enable current to flow from said cold cathode to said anode.

18. The apparatus of claim 17 wherein the space between said cold cathode and said anode is in the submicron range.

19. The apparatus of claim 18 wherein said space is less than or equal to 0.1 micron.

20. The apparatus of claim 19 wherein said space is about 0.1 micron.

21. The apparatus of claim 17 wherein said cold cathode is on an underside of a computer chip substrate.

22. The apparatus of claim 17 wherein said supply of electrical power is variable, whereby a rate of heat pumping may be controlled.

23. A vacuum diode comprising:

a cold cathode having a work function consistent with a copious electron emission at about room temperature, said cold cathode thermally coupled to a first mass from which heat is to be removed;

an anode thermally coupled to a second mass to which heat is to be carried, with said cold cathode and said anode being closely spaced;

a vacuum separating said cold cathode and said anode; and a supply of electrical power for supplying said vacuum diode a voltage sufficient to enable said copious thermionic electron emission from said cold cathode to occur and said voltage sufficient to enable current to flow from said cold cathode to said anode.

24. The apparatus of claim 23 wherein the space between said cold cathode and said anode is less than or equal to 0.1 micron.

25. The apparatus of claim 24 wherein said space is about 0.1 micron.

26. The apparatus of claim 23 wherein said cold cathode is formed on an underside of a computer chip substrate.

27. The apparatus of claim 23 wherein said supply of electrical power is continuously variable, whereby a rate of heat pumping may be controlled.

28. The apparatus of claim 23 wherein said cold cathode has a work function of 0.3 eV or less.

29. The apparatus of claim 23 wherein said anode has a work function and comprises a material capable of copious electron emission at the temperature of said second mass.

30. The apparatus of claim 29 wherein said anode has a work function of 0.3 eV or less.

* * * * *